(12) United States Patent
Yamamoto

(10) Patent No.: US 8,161,115 B2
(45) Date of Patent: Apr. 17, 2012

(54) SYSTEM AND METHOD FOR EFFECTIVE MAIL TRANSMISSION

(75) Inventor: Gaku Yamamoto, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 2630 days.

(21) Appl. No.: 10/170,756

(22) Filed: Jun. 13, 2002

(65) Prior Publication Data

US 2003/0018727 A1 Jan. 23, 2003

(30) Foreign Application Priority Data

Jun. 15, 2001 (JP) .................................. 2001-181558

(51) Int. Cl.
*G06F 15/16* (2006.01)
(52) U.S. Cl. ......... 709/206; 709/203; 709/204; 709/205
(58) Field of Classification Search ............. 395/200.36; 709/227, 204, 206, 249; 358/400; 707/10, 707/200

See application file for complete search history.

(56) References Cited

U.S. PATENT DOCUMENTS

| | | | | | |
|---|---|---|---|---|---|
| 5,937,162 | A | * | 8/1999 | Funk et al. ..................... | 709/206 |
| 6,044,395 | A | * | 3/2000 | Costales et al. ............... | 709/206 |
| 6,147,773 | A | * | 11/2000 | Taylor et al. ................... | 358/400 |
| 6,304,914 | B1 | * | 10/2001 | Deo et al. ....................... | 709/247 |
| 6,327,046 | B1 | * | 12/2001 | Miyamoto et al. ........... | 358/1.15 |
| 6,507,866 | B1 | * | 1/2003 | Barchi ........................... | 709/207 |
| 6,594,032 | B1 | * | 7/2003 | Hiroki et al. .................. | 358/1.15 |
| 6,675,197 | B1 | * | 1/2004 | Satoh et al. .................... | 709/204 |
| 6,721,784 | B1 | * | 4/2004 | Leonard et al. ............... | 709/206 |
| 6,760,753 | B1 | * | 7/2004 | Ohgushi et al. ............... | 709/206 |
| 6,816,885 | B1 | * | 11/2004 | Raghunandan ............... | 709/206 |
| 6,889,246 | B1 | * | 5/2005 | Kawamoto et al. ........... | 709/204 |
| 6,963,417 | B1 | * | 11/2005 | Saito ............................. | 358/1.15 |
| 2002/0161626 | A1 | * | 10/2002 | Plante et al. .................... | 705/10 |
| 2002/0169835 | A1 | * | 11/2002 | Paul et al. ...................... | 709/206 |
| 2003/0028580 | A1 | * | 2/2003 | Kucherawy ................... | 709/101 |
| 2004/0221011 | A1 | * | 11/2004 | Smith et al. ................... | 709/206 |
| 2005/0081059 | A1 | * | 4/2005 | Bandini et al. ................ | 713/201 |

FOREIGN PATENT DOCUMENTS

| | | |
|---|---|---|
| JP | 10-308767 | 11/1998 |
| JP | 2000-066974 | 3/2000 |
| JP | 2001-175557 | 6/2001 |

* cited by examiner

*Primary Examiner* — Thu Nguyen
*Assistant Examiner* — Angela Widhalm
(74) *Attorney, Agent, or Firm* — Gail H. Zarick; Anne Vachon Dougherty

(57) ABSTRACT

A system and method for rapidly transmitting a large volume of e-mails. Based on domain names obtained from destination mailing addresses, a server 10 for a sender sorts e-mails to be transmitted, generates transfer data for each domain name by grouping e-mail data, and uses FTP to transmit the transfer data to servers 30 for distributors whose domain names correspond to those for which the transfer data were generated. At this time, compression is effective for improving the transmission of the transfer data. The server 30, upon receiving transfer data, analyzes the received transfer data to obtain the data for individual e-mails, and distributes the e-mail data to the mail boxes of individual recipients.

11 Claims, 15 Drawing Sheets

```
<FORM>
<Notify exchange rate>           P
To <EXPORT=username>

We are notifying you that your designated rate of <EXPORT=meigara> has been exceeded.
                                                                    P
TTS at registration time :    <EXPORT=torokutts> yen
TTB at registration time :    <EXPORT=torokuttb> yen Notified rate 1 (<EXPORT=sashine1type>)  :  <EXPORT=sashine1> yen
Notified rate 2 (<EXPORT=sashine2type>)  :  <EXPORT=sashine2> yen
Nearest TTS    :    <EXPORT=tts> yen
Nearest TTB    :    <EXPORT=ttb> yen
TTS on previous day  :   <EXPORT=oldratetts> yen
TTB on previous day  :   <EXPORT=oldratettb> yen Notification rate <EXPORT=hit_sashine> has been reached. Please refer to this to change the notified rate.

</FORM>
```

Fig. 11

SYSTEM AND METHOD FOR EFFECTIVE MAIL TRANSMISSION

BACKGROUND OF THE INVENTION

1. Field of the Invention

The present invention generally relates to methods and systems for mail transmission. Specifically, the invention provides a mechanism especially appropriate for the transfer of a great number of e-mails addressed to multiple recipients.

2. Description of the Related Art

As the use of e-mail has spread explosively, senders, including a variety of different companies, have come to rely on it for the dissemination of topical product and service information for clients. For example, manufacturers use e-mail to advertise new products, while banks and stock brokerages employ it for the distribution of stock exchange and stock price information. In general, information distribution services are on the increase, and even today, there are some companies that distribute relevant information to several hundreds of thousands of clients.

As is well known, when preparing to dispatch an e-mail, a sender creates e-mail data by entering a mailing address of a recipient, a subject and a text, and then transmits this data to a mail server the sender uses. Thereafter, based on the mailing address, the mail server transmits the e-mail data, via the Internet, to the mail server that the recipient uses. Then, by accessing the mail server, the recipient can retrieve and read the e-mail transmitted by the sender. Or, if the recipient subscribes to an e-mail service provided via a mobile phone terminal, in order to retrieve the e-mail, he or she can not only access the mail server whenever it is convenient, but also can wait until a notification is received from the mail server.

A communication protocol called SMTP (Simple Mail Transfer Protocol), shown in FIG. 1, is employed to transmit e-mail data from a mail server that a sender uses to a mail server that a recipient uses. Predetermined procedures, such as "request for connection", "SMTP standby OK", "sender address", "acknowledge sender address", "sender mailing address" and "acknowledge sender mailing address", are performed between the transmission side (the mail server used by the sender) and the reception side (the mail server used by the recipient), and then, "mail text" data is transferred.

The mail transfer between the mail servers using SMTP is also performed in the above described information distribution service for a large number of recipients using e-mails.

However, when this conventional technique is used, the following problems are encountered.

As is shown in FIG. 1, in the SMTP, many procedures must be performed before and after the e-mail text is transferred. In addition, during the e-mail transfer process, steps in consonance with the number of e-mails to be transferred are required among the mail servers of the transmission sides and reception sides. Since there is a hardware restriction on this process, the number of processes that can be performed in parallel is limited.

While no critical problem is encountered so long as the volume of the e-mail transmitted is small, transmitting a lot of e-mails, for example, several hundred thousand e-mails, takes a great deal of time. For instance, currently, a conventional mail server that can transfer ten e-mails per second by the current SMTP requires at least five hours to complete the transfer of two hundred thousand e-mails.

Further, in accordance with SMTP, e-mail is not directly transmitted by the mail server of the sender to the mail server of the recipient, but instead is relayed via (multiple) SMTP servers on the Internet. That is, e-mail data from the sender is sequentially transferred from one server to another until finally the mail server of the recipient is reached. During this transmission processing, the procedures shown in FIG. 1 are performed between two contiguous servers using SMTP. Therefore, since a load is thereby imposed on the entire Internet, the above described problem becomes even more critical and can not be ignored.

On the transmission side, for transmission of e-mail in volume, a fixed document format, called a template, is employed to generate e-mail data. And an application program is presently available that can automatically generate e-mail data for all of a number of intended recipients so long as the minimum information, such as a stock exchange or a stock price, is inserted into the template, and using this application, one of the currently available PCs (Personal Computers) can generate enough data for 1000 e-mails every second. That is, as an example, two hundred thousand e-mails can be created in about 200 seconds.

Furthermore, since a mail server on the reception side, particularly a mail server operated by a mobile phone company or a major ISP (Internet Service Provider), has a certain level of capability on the assumption that at least several hundred thousand to one million users might access, and also a mail server distributes e-mail only if it is accessed by a recipient, no big problem will occur, even with the current capability.

As is described above, for the transfer of a large volume of e-mail, data transfer among mail servers by SMTP has constituted a bottleneck.

To resolve this problem, as is shown in FIG. 2, an modified SMTP has been proposed according to which multiple e-mails are transferred collectively within one session. Specifically, in the "acknowledge sender address" process of FIG. 2, according to SMTP, a keyword "SLIDE" is transferred by the reception side to the transmission side to notify the transmission side that the reception side can cope with the expansion function. Then, the transmission side sequentially transmits, to the reception side, "recipient mailing addresses (A, B, . . . )" for respective recipients of multiple e-mails that are to be collated and transferred. At this time, "SLIDERANGE=-" data is also transmitted for the e-mail address of each recipient to represent the data portion (by using the locations of bytes) for mail text to be transferred to the recipient. As is described above, in accordance with this proposal, data for multiple e-mails are transmitted collectively in mass in order to reduce the procedures performed in accordance with SMTP.

However, so long as SMTP is employed, the protocol in itself requires that multiple servers be used to relay the e-mail data, and as a result, dramatic effects can not always be obtained. Further, in many cases where companies provide information for their clients by e-mails, the same mail text or almost all the mail text is employed for all the e-mails while only destination mailing addresses differ. In these cases, the amount of data for the mail text is enormously expanded when a large number of e-mails are to be transmitted, it can be said that no ameliorative effects are obtained.

Recently, banks and stock brokerages have been requesting the performance of the information distribution services using e-mail many times a day, so that they can promptly provide clients topical information, such as stock exchange and stock price information. And for the above described reasons, the current technique cannot cope with this request. To resolve the conventional technical shortcomings, it is one object of the present invention to provide a mail transmission system, a mail server, a mail transfer system and a mail transfer method so that a large volume of e-mail can be transferred rapidly.

SUMMARY OF THE INVENTION

To achieve the above object, the present inventors carefully studied efficient e-mail transfer, and focused on the fact that a lot of e-mail users (recipients) use e-mail services provided by major Internet Service Providers (ISPS) or major mobile phone companies. That is, many mailing addresses used as the transmission destinations for e-mail include the domain names of servers (mail servers) run by the major ISPs and mobile phone companies.

Specifically, according to the present invention, a mail transmission system receives e-mail data, which includes destination address information and mail text information constituted by a mail text and a subject name, and sorts the e-mail based on server domain information that is included in the destination address information. As for the sorting results, multiple sets of the e-mail data addressed for multiple recipients in which the server domain information is the same (i.e., the mail server is the same) are grouped, and the transmission data is generated. The generated transmission data is transmitted via a network to a server designated by the server domain information. In this manner, based on the server domain information included in the destination address information, the server of the sender groups and transmits the e-mail data for each server, such as an each ISP server, that the recipient uses. Therefore, the e-mail data (transmission data) can be efficiently transmitted from the mail transmission system (server) of the sender to the server, such as the ISP server. It is especially preferable that, instead of SMTP, FTP (File Transfer Protocol) or HTTP (Hypertext Transfer Protocol) be employed between the mail transmission system of the sender and the server of the recipient.

Further, when the server domain information is for a server that has not been registered in advance, i.e., when an e-mail is transmitted to a recipient who uses a service other than an e-mail service provided by a major ISP or a mobile phone company that is registered in advance, the conventional mail transmission means using SMTP may be employed to transmit data for each e-mail.

According to the invention, a mail transmission system receives e-mail data that includes destination address information and mail text information, groups e-mail data addressed for multiple recipients, in which the server domain information included in the destination address information is common, and generates transmission data addressed to a server that is designated by the server domain information, and then transmits the transmission data to the server via a network.

The transmission data must be generated by using the e-mail data that are sorted for the individual destination servers. For this data generation, the mail transmission system may receive the e-mail data that includes the sender information in addition to the destination address information and the mail text information, and then it may sort the e-mail data, or a terminal, such as a PC, that generates e-mail data may sort these e-mail data in advance. The transmission data can also be generated based on the e-mail data, which includes data for a template that formats a mail text and data for a keyword that is to be inserted to the template. Further, the transmission data can also be generated based on e-mail data, which includes data that designates a template for formatting the mail text and data for a keyword to be inserted. That is, in this case, the data for the template is stored by the destination server.

According to the present invention, a mail server receives, via a network, transfer data that includes destination information addressed to the mail sever, address information for multiple recipients of e-mail data, and mail text information that is to be commonly distributed to the recipients. Then, the mail server analyzes the transfer data, and generates e-mail data for each recipient that includes the address information and the mail text information. Thereafter, as in the conventional case, the e-mail data is distributed to the terminal or the mail box of a recipient designated by the address information. When the mail server receives the transfer data as the mail text information, which includes data for a template and data for a keyword that is to be inserted into the template, the mail server inserts the keyword into the template and generates mail text information using the e-mail data. When the mail server receives the transfer data, which includes data designating the template and the data for a keyword to be inserted into the template, the mail server retrieves, from the template data storage unit, data for the designated template, and inserts the keyword therein, so as to generate the mail text information.

According to a mail transfer system and a mail transfer method for this invention, when e-mail data is received, multiple sets of e-mail data for a plurality of recipients are grouped, and the transfer data is generated by adding the destination information addressed to a reception server. Based on the added destination information, the transfer data is transmitted to the reception server via the network. Then, the reception server analyzes the transfer data, and obtains and distributes the data for each e-mail.

At this time, information may be recorded indicating that either the transfer data has been transmitted from the transmission server to the reception server, or the e-mail data from the reception server has been distributed to the destination (recipient), and the assessment of compensation may be managed based on this information. As a result, the compensation can be obtained when the sender, the distributor or the recipient employs the services provided by the mail transfer system or the mail transfer method.

The invention can also be implemented as a program product that permits a computer to transmit, via a network, grouped e-mail data for multiple recipients. This program product permits a computer to perform: a process for receiving e-mail data that includes destination address information and mail text information; a process for grouping e-mail data for multiple recipients, in which the server domain information included in the destination address information is common, and for generating transmission data by adding destination information addressed to a server that is designated by the server domain information; and a process, based on the destination information, for transmitting the transmission data to the designated server.

The present invention can also be implemented as a program product that permits a mail server to receive grouped e-mail data for multiple recipients via a network. This program product permits a mail server to perform: a process for receiving transfer data that includes destination information addressed to the mail server, address information for the recipients of the e-mail data, and mail text information to be distributed to the recipients; a process for analyzing the transfer data and generating the e-mail data for each recipient; and a process for distributing the obtained e-mail data to the recipient designated by the address information.

BRIEF DESCRIPTION OF THE DRAWINGS

FIG. 11 is a diagram showing an example template.

DETAILED DESCRIPTION OF A PREFERRED EMBODIMENT OF THE INVENTION

The preferred embodiments of the present invention will now be described in detail while referring to the accompanying drawings.

1. First Embodiment

Figure 3:
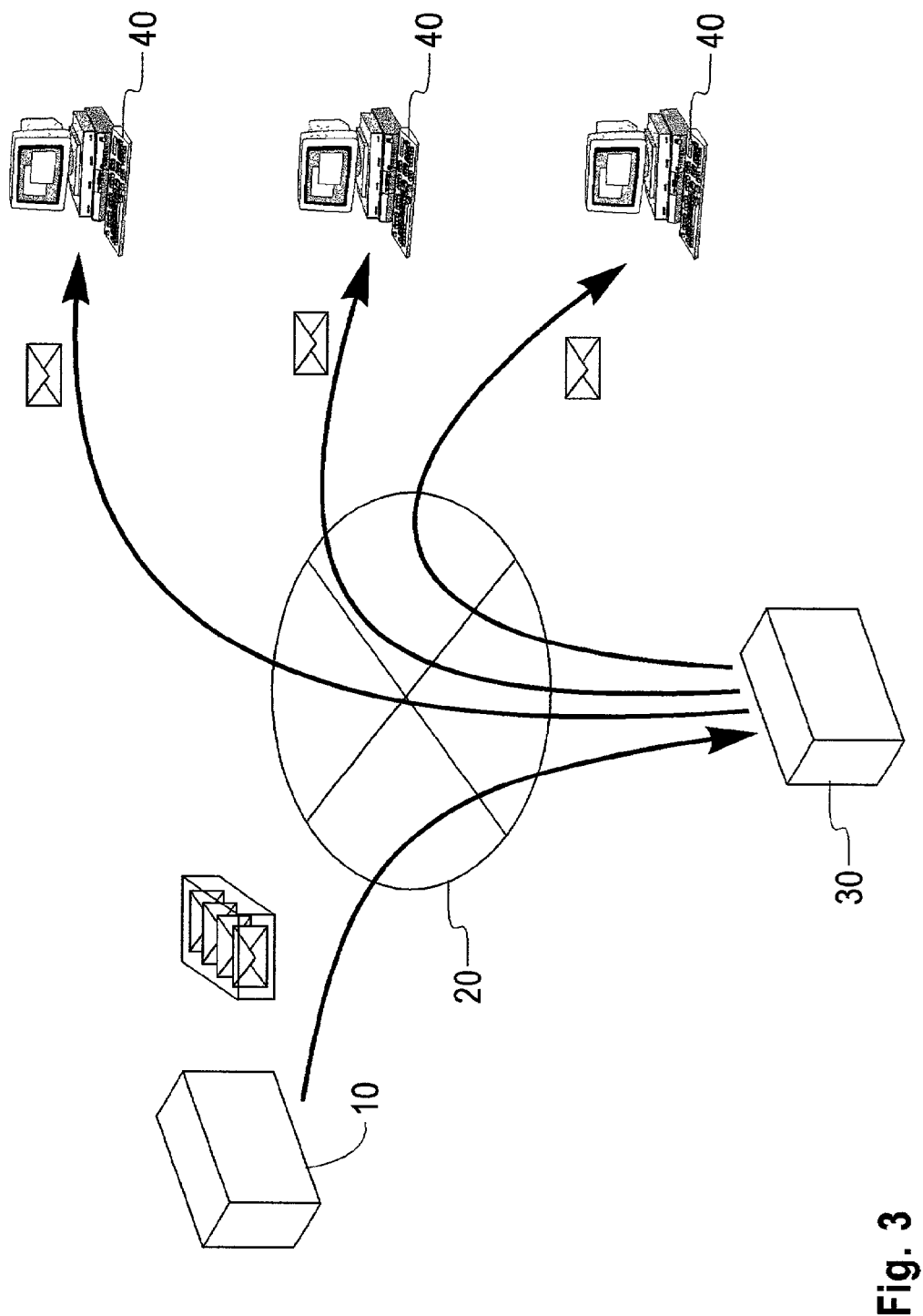
FIG. 3 is a diagram showing the configuration of an e-mail transfer system according to the first embodiment of the present invention.

FIG. 3 is a diagram for explaining the configuration of an e-mail transfer system according to a first embodiment of the present invention. According to the e-mail transfer system, when an information sender, such as a bank or a stock brokerage, desires to transmit multiple e-mails through a server 10 (a mail transmission system or a transmission server), the server 10 collates data of these e-mails for each distributor, such as an ISP, and transmits the data to a server 30 (a reception server) of the distributor via a network 20 such as the Internet. The server 30 of the distributor analyzes the collated data, generates multiple e-mails and distributes the e-mails to the destinations (clients) specified by the mailing addresses.

In this embodiment, the e-mail transfer system is employed by a bank or a stock brokerage to notify their client (an e-mail recipient), using an e-mail, that the rate of the brand of a derivative, such as a foreign currency or a stock, that has been selected by the client in advance has exceeded a threshold value registered by the client. In this case, the bank or the stock brokerage serves as an e-mail sender. When a specific rate has been changed, the sender refers to the registered information (brands or threshold values) for all the clients, selects clients to whom the e-mail should be transmitted, and creates and forwards e-mails to the pertinent clients. At this time, since the name of a client, the brand selected by the client and the rate information are included in the text of the e-mail, the contents of an e-mail differs, depending on the client.

Figure 4:
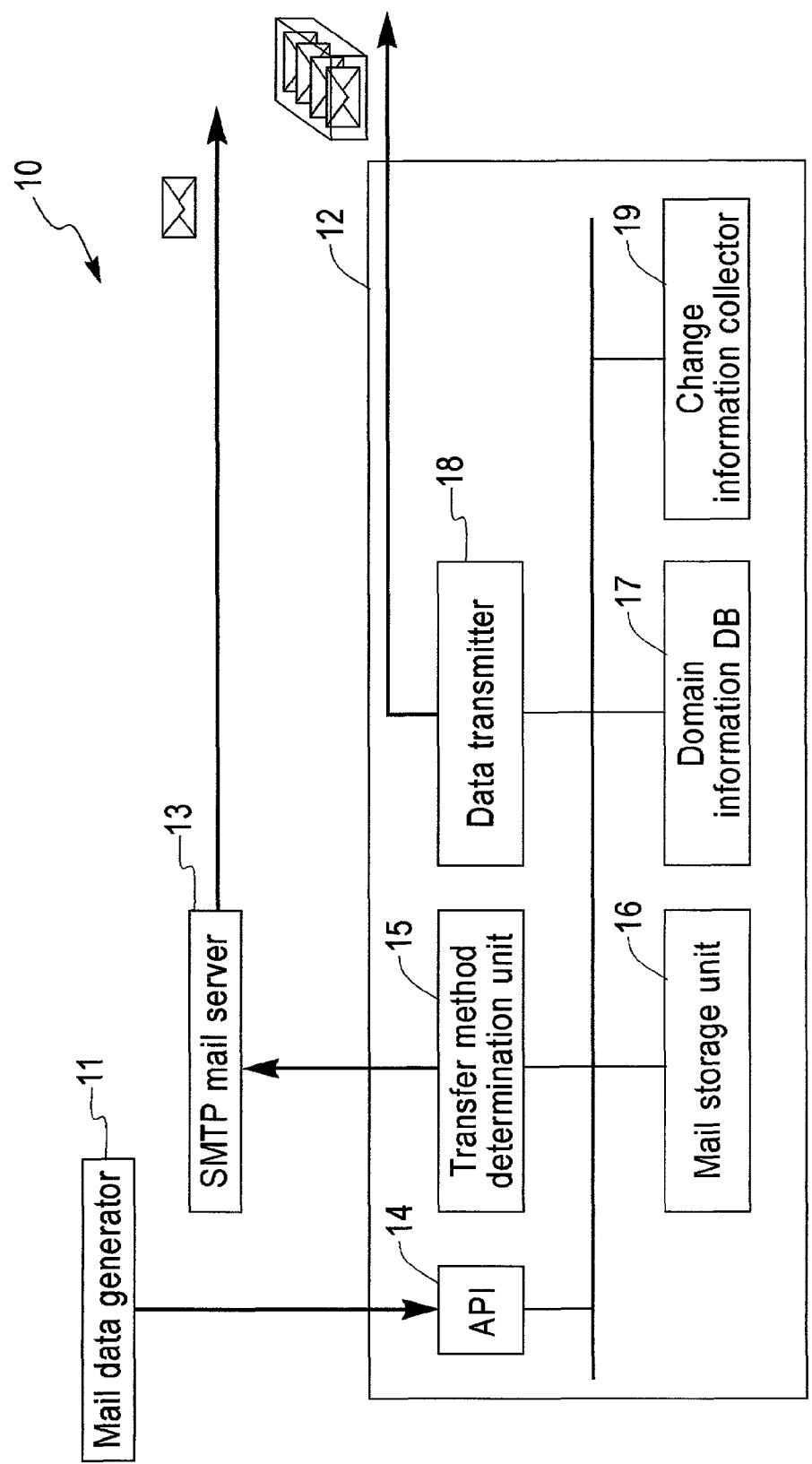
FIG. 4 is a diagram showing the configuration of a server for a sender according to the first embodiment.

As is shown in FIG. 4, the server 10 of the sender who transmits e-mail can be connected to a mail data generator 11, which is a terminal such as a PC (Personal Computer), and includes a main server 12 for collating or grouping the data of multiple e-mails and transmitting them, and an SMTP mail server (mail transmission means) 13 for transmitting e-mail by SMTP as in the conventional case.

Figure 5:
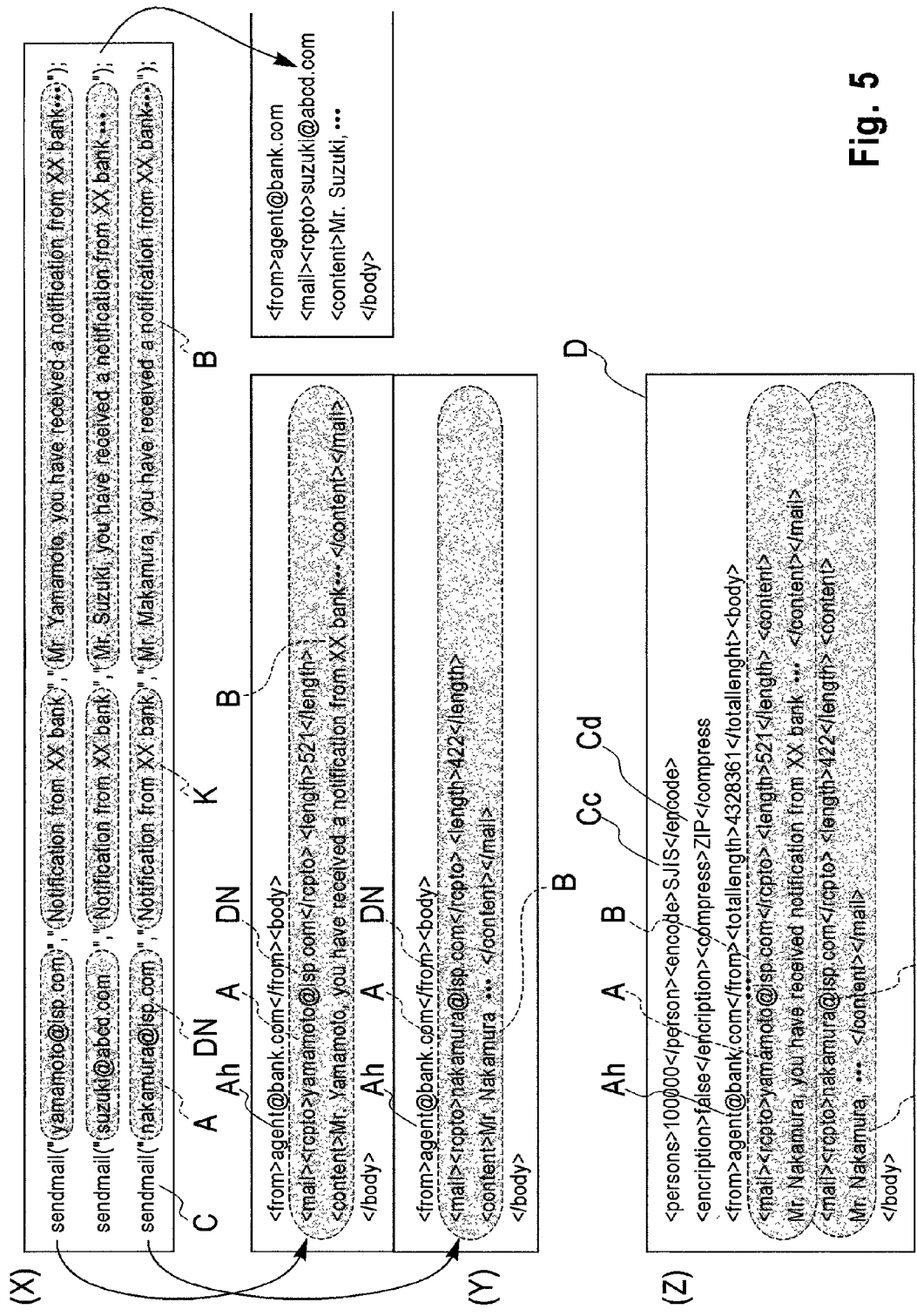
FIG. 5 is a diagram showing the changes in sample data effected in the process that transfer data is generated.

Generally, in the same manner as when an e-mail is created by using a PC, the mail data generator 11 generates data for each e-mail by entering a mailing address, a subject and a mail text. Then, when the creator of the e-mail performs a predetermined mail transmission operation, or each time a predetermined period has elapsed, the mail data generator 11 transfers the currently created e-mail data to the main server 12. Sample data X in FIG. 5 is a diagram showing example data for multiple e-mails that are generated by using an application executed in the mail data generator 11. The e-mail data includes a mailing address (destination address information) A, which is the destination for the e-mail, a subject name K and a mail text (mail text information) B.

The main server 12 includes an API (Application Program Interface; data reception means) 14, which corresponds to an application program used to generating e-mail in the mail data generator 11; a transfer method determination unit (e-mail sorting means) 15, a mail storage unit 16, a domain information database (DB) 17, a data transmitter 18 and a charge information collector (compensation manager) 19.

When the API 14 receives the e-mail data generated by the mail data generator 11, the transfer method determination unit 15 employs a predetermined standard to determine whether the e-mails should be grouped and transferred by the main server 12 in a lump, or should be transferred by the SMTP mail server 13 one by one. The data for the domain name (server domain information) DN of an ISP that allows transfer of e-mails in a lump is stored in the domain information DB 17. Thus, the transfer method determination unit 15 can determine whether the domain name DN of the mailing address A (generally expressed as "user name@domain name"), which is the destination of the received e-mail data, is the one registered in the domain information DB 17.

The e-mail data that the transfer method determination unit 15 has determined to be transferred in a lump is transmitted to the mail storage unit 16 and temporarily stored therein. Further, the e-mail data that the determination unit 15 has determined to be transferred from the SMTP mail server 13 is transmitted to the SMTP mail server 13, which transmits the e-mails one by one by the SMTP method as in the conventional case.

The e-mail data that the transfer method determination unit 15 has determined to be transferred in a lump is stored in the mail storage unit 16 as is shown in sample data Y in FIG. 5, so that it is sorted or can be sorted for each domain name DN in each mailing address A.

The data transmitter 18, which also serves as transmission data generation means, extracts the e-mail data from the mail storage unit 16 for each domain name DN periodically, for example, and collates the extracted data to obtain a predetermined form shown in sample data Z in FIG. 5 (which will be described later) that is used to generate transfer data (transmission data) D. Then, the data transmitter 18 serves as data transmission means, and transmits the transfer data D via a network 20 such as the Internet, to the server 30 that corresponds to the domain name DN. At this time, the data transmitter 18 can transmit the transfer data D as a single e-mail to the server 30 that corresponds to the domain name DN. However, preferably in this embodiment, by using FTP, the transfer data D is regarded as the data for one file.

Furthermore, for rapid data transfer it is preferable that the data transmitter 18 compress data using a well known data compression method, such as PKZIP or WinZIP. For data transmission it is also preferable that security be provided by employing a secure communication technique, such as encryption for which an SSL (Secure Sockets Layer) is used. Each time, based on a predetermined contract, e-mails are collated and transmitted by the data transmitter 18, the charge information collector 19 counts and stores, as charge information, the destinations (domain name DNs) of the e-mails, the number of e-mails transmitted, and the number of transmissions in order to pay a fee to the distributor, such as an ISP, that operates the server 30, or to receive a fee from the distributor.

Figure 6:
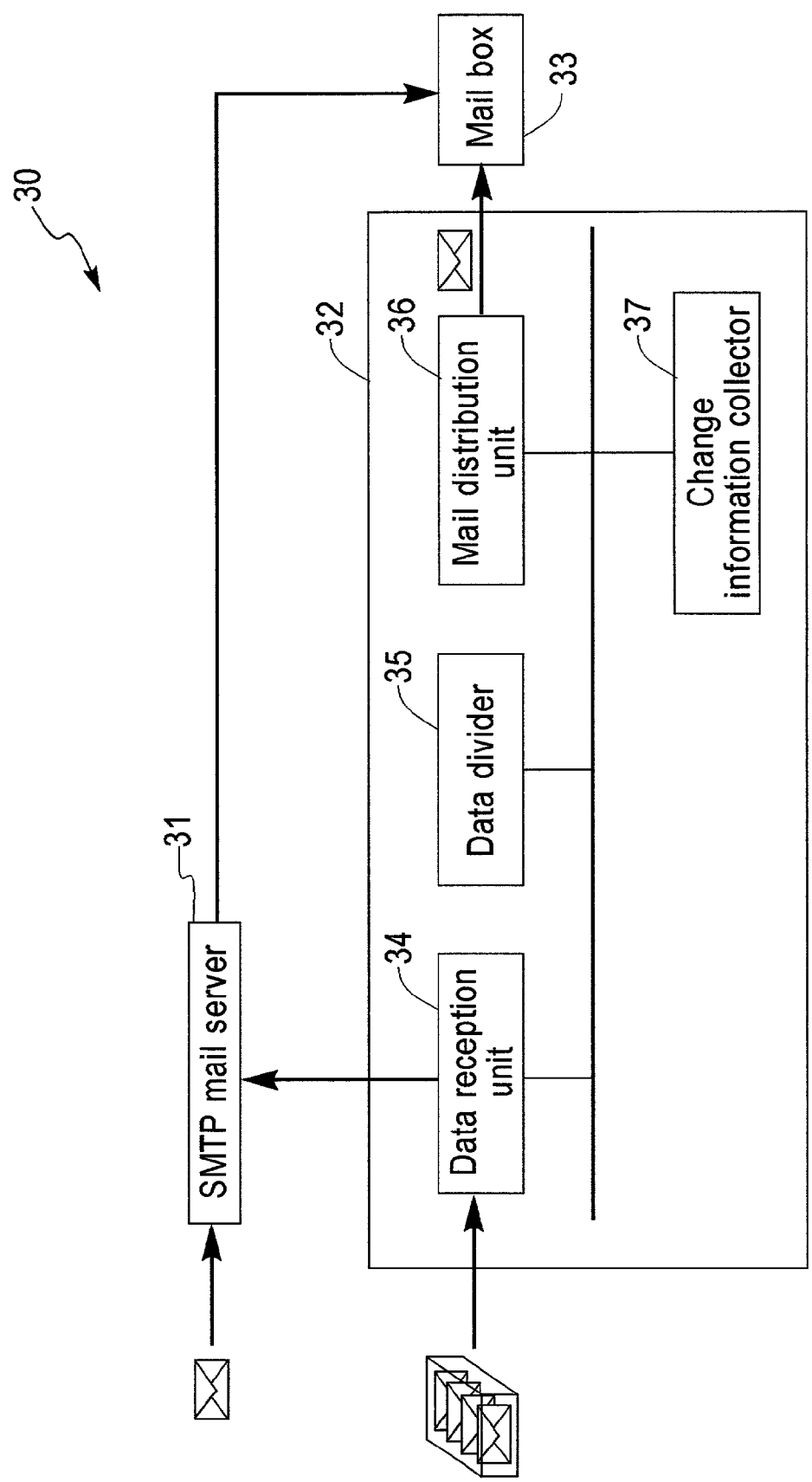
FIG. 6 is a diagram showing the configuration of a server for a distributor according to the first embodiment.

As is shown in FIG. 6, the server 30 of the distributor includes an SMTP mail server 31 for receiving e-mail data from the SMTP mail server 13 of the server 10; a main server 32 for receiving data for multiple e-mails transferred in a lump by the main server 12 of the server 10; and mail boxes 33, one of which is allocated for each user (recipient) who employs the server 30.

The main server 32 includes a data reception unit 34, a data divider (e-mail data acquisition unit) 35, a mail distribution unit 36 and a charge information collector (compensation manager) 37. The data reception unit 34 receives e-mail data via the network 20 from the data transmitter 18 of the main server 12, and transmits the e-mail data to the data divider 35. Based on a predetermined format, the data divider 35 divides the collated data for multiple e-mails into individual e-mails, and returns the data to the state shown in sample data Y in FIG. 5. The mail distribution unit 36 distributes each e-mail obtained by the data divider 35 to the corresponding mail box 33 in accordance with the mailing address A of the e-mail.

In addition, each time grouped e-mails are received by the data reception unit 34 or are distributed by the mail distribution unit 36 based on a predetermined contract, the charge information collector 37 counts and stores, as charge information, the destinations (mailing addresses A) of e-mails, the number of the e-mails and the number of transfers in order to pay a fee to the sender who runs the server 10, to receive a fee from the sender, and to collect fees from the recipients.

An explanation will now be given for specific example processing performed by the thus arranged e-mail transfer system from the time e-mails are issued by a sender until they are received by recipients.

Figure 7:
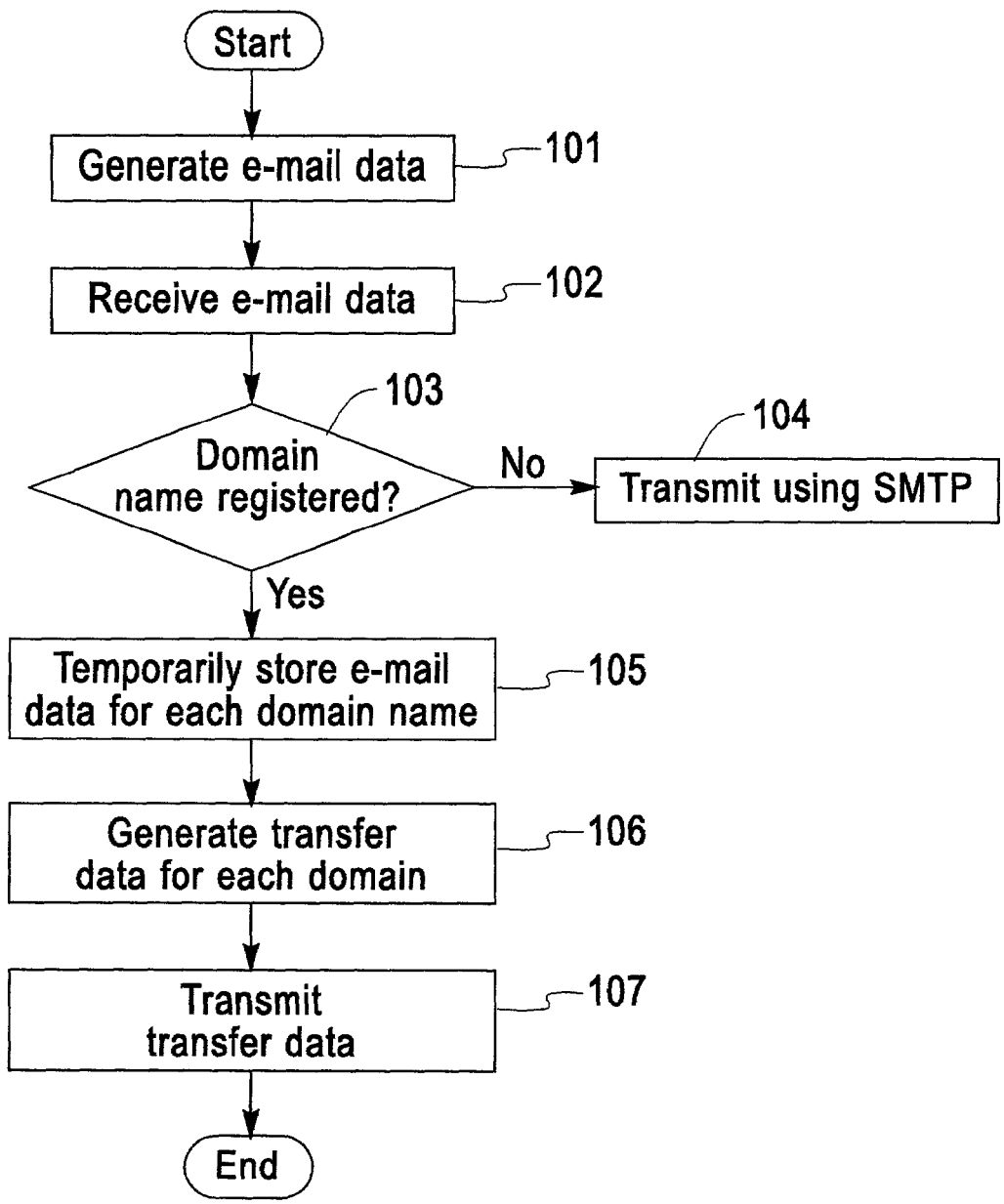
FIG. 7 is a flowchart showing the processing performed on the sender side.

FIG. 7 is a flowchart showing the processing performed by the server 10 when an information sender, such as a bank or a stock brokerage, transmits multiple e-mails using the server 10. As is shown in FIG. 7, for the generation on the sender side of e-mails addressed to clients who have been registered in advance, the mail data generator 11 such as the PC terminals, generates e-mail data, as the mailing addresses A, the subject names K and the mail text B are input (step 101). Then, when an e-mail creator performs a predetermined mail transmission operation, the application of the mail data generator 11 holds the mailing addresses A, as the destination for the e-mails, the subject names K and the mail text B, with the command C "sendmail" attached, as is shown in sample data X in FIG. 5.

Each time a specific period of time has elapsed, or when the e-mail creator has performed a predetermined mail transmission operation, the mail data generator 11 transmits the currently created e-mail data to the API 14 of the main server 12 (step 102). The individual e-mail data is converted into a predetermined language, such as HTML (Hypertext Markup Language) and XML (Extensible Markup Language), as is shown in sample data Y in FIG. 5, before the data is output by the application. In this case, the e-mail data includes the sender's mailing address (sender information) Ah, the destination mailing address A and the mail text B. The mailing address Ah is written between tags <from> and </from>, and the mailing address A and the mail text B are written between identification tags <mail> and </mail>.

The API 14 receives the e-mail data and transmits it to the transfer method determination unit 15. The transfer method determination unit 15 refers to the destination mailing address A included in the received e-mail data (see sample data Y in FIG. 5) to determine whether the domain name DN for the mailing address A is one that has been registered in advance in the domain information DB 17 (step 103).

When the domain name DN has not been registered, the e-mail data are transmitted unchanged to the SMTP mail server 13, and as in the conventional manner, each e-mail that is so handled is transmitted to the appropriate server 30 in accordance with SMTP (step 104). When the domain name DN has been registered, the e-mail data is transmitted to the mail storage unit 16 where it is temporarily stored, so that subsequently the data for all the e-mails can be sorted in accordance with the domain names DN included in the mailing addresses A (step 105).

Thereafter, each time a predetermined period has elapsed, or each time the count of the e-mails stored in the mail storage unit 16 has reached a predetermined number, the e-mail data for each domain name DN is collectively extracted from the mail storage unit 16 and are transmitted to the data transmitter 18. From data for multiple e-mails the domain names DN of which in the destination mailing addresses A are the same, the data transmitter 18 extracts, unchanged, the destination mailing address A and the mail text B that are written between tags <mail> and </mail>, as is shown in sample data Y in FIG. 5. Then, as is shown in sample data Z in FIG. 5, the mailing addresses A and the mail text B, which are written between the tags <mail> and </mail> are arranged in a predetermined order, e.g., in the order of their creation times, and tags <body> and </body> are positioned to sandwich the data A and B. Further, to generate the transfer data D, sender information that has been set in advance, the mailing address Ah of the sender, the character code Cc and the data compression method Cd, is added (step 106).

Figure 8:
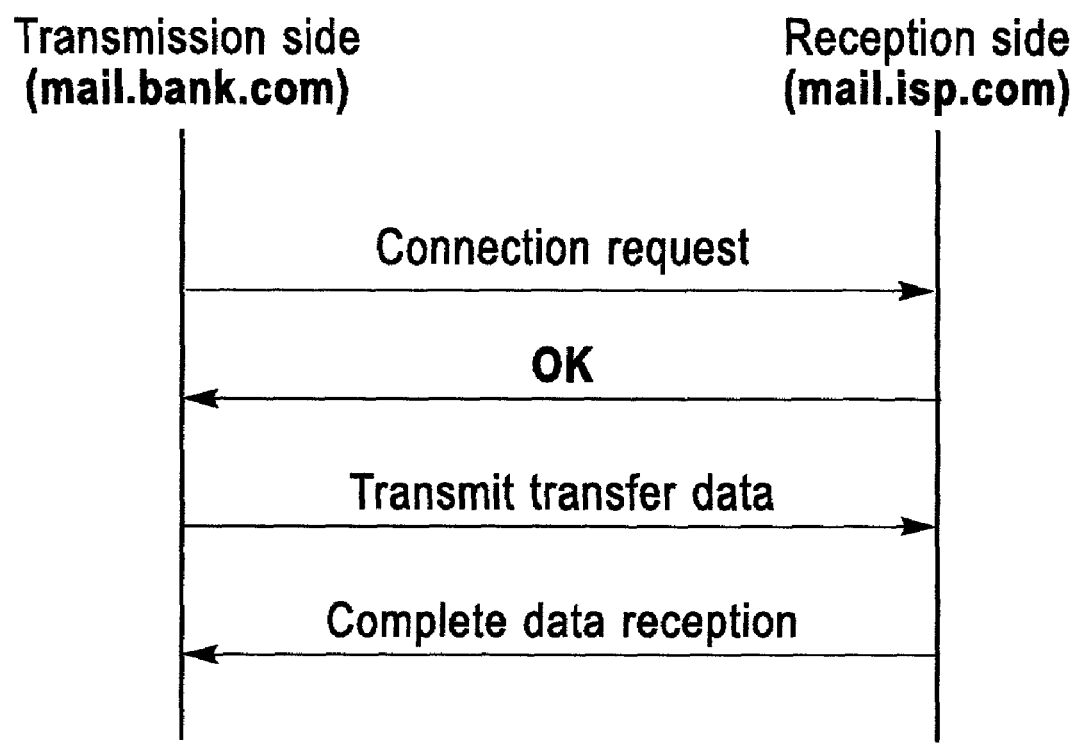
FIG. 8 is a diagram showing the procedures for the functions performed between the sender's server and the distributer's server.

The data transmitter 18 compresses or encrypts the transfer data D as needed, and adds to the obtained data D destination information (an address) for the server 30 that corresponds to the domain name DN included in the transfer data D. The obtained data is thereafter transmitted to the server 30 via the network 20 (step 107). At this time, as is shown in FIG. 8, in accordance with the FTP method, the data transmitter 18 exchanges a connection request and an acknowledgement with the reception server 30 designated by the domain name DN, and transmits the transfer data D as a single file.

Figure 9:
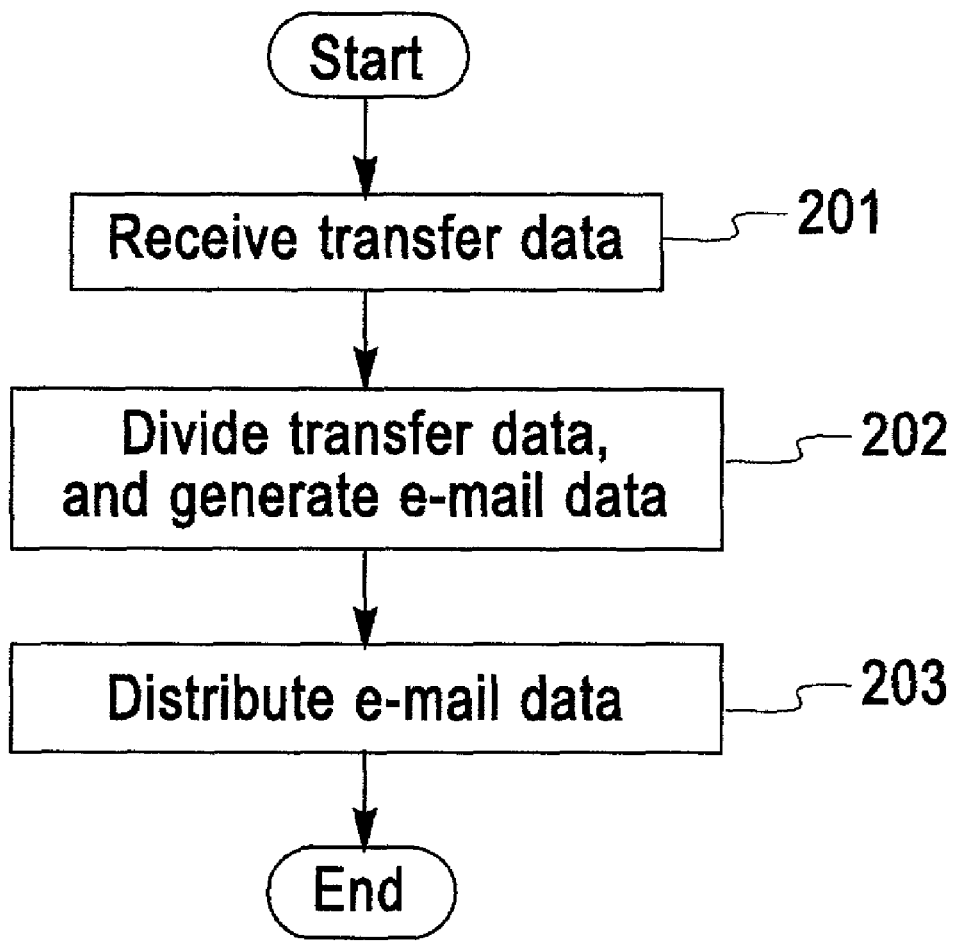
FIG. 9 is a flowchart showing the processing performed on the recipient side.

FIG. 9 is a flowchart showing the processing performed by the server 30 of the distributor who receives the transfer data D via the network 20. The data reception unit 34 of the server 30 transmits the received transfer data D to the data divider 35 (step 201).

The data divider 35 then divides the transfer data D, which has been generated by grouping data for multiple e-mails, and obtains the e-mail data that corresponds to each destination mailing address A. During this process, the information written for each e-mail between the identification tags <mail> and </mail>, i.e., the mailing address A and the mail text B, is extracted from the transfer data D structured as is shown in sample data Z in FIG. 5, and the sender's mailing address Ah, written between the tags <from> and </from>, is added. As a result, the data, as shown in sample data y in FIG. 5, is obtained for each of the original e-mails (step 202).

Figure 1:
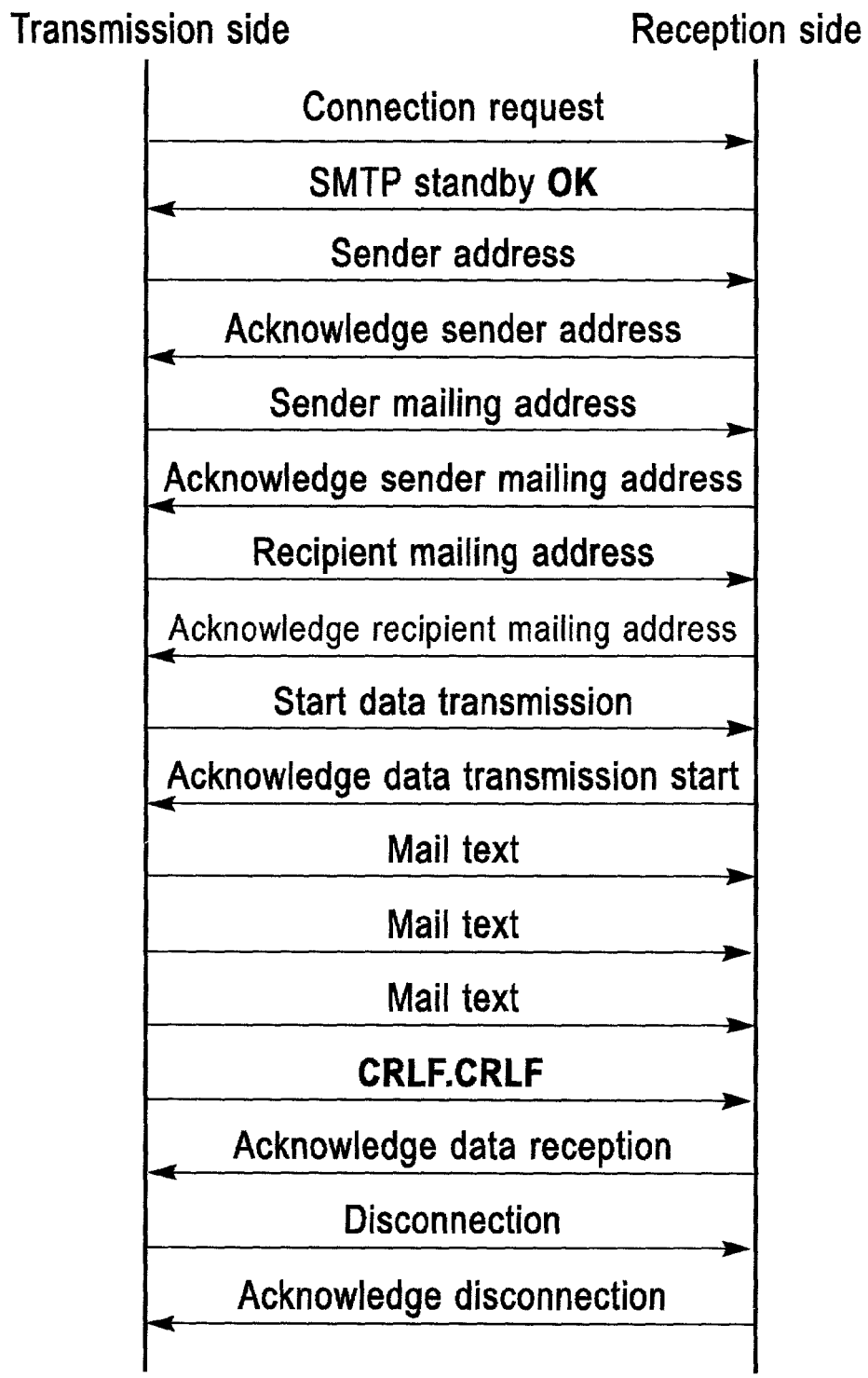
FIG. 1 is a diagram showing the conventional procedures performed in accordance with SMTP.
Figure 2:
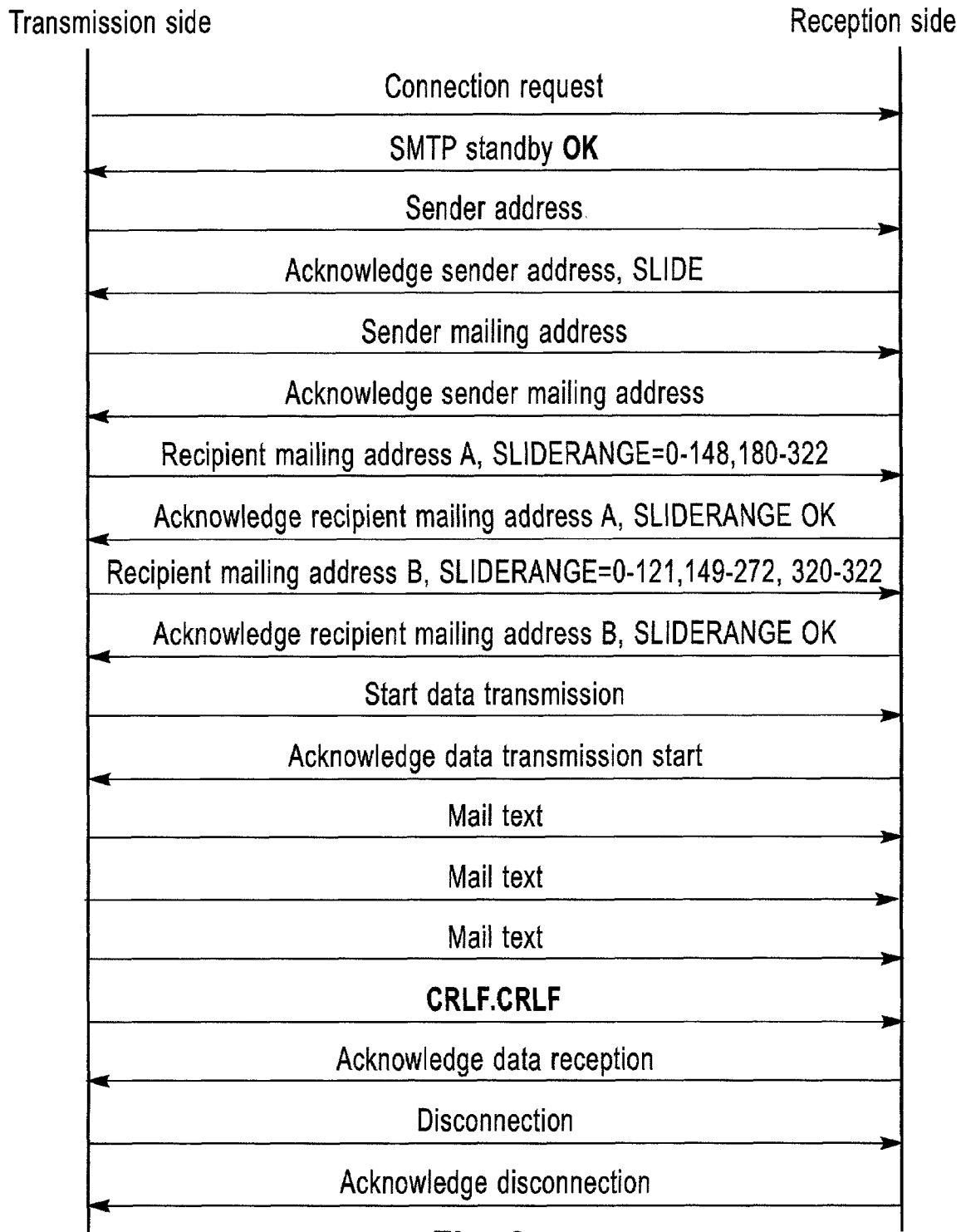
FIG. 2 is a diagram showing the procedures performed by another method.

Thereafter, for each e-mail, the data divider 35 transmits the data to the mail distribution unit 36, which in turn, in accordance with a mailing address A, distributes the e-mail data to the mail box 33 assigned to the relevant user (recipient) (step 203). Subsequently, in the same manner as when e-mail is normally received, the recipient accesses the mail box 33 by using a terminal 40 (see FIG. 1), such as a PC or a mobile phone, and extracts the e-mail data from the mail box 33. In this fashion, the separate e-mails can be received by the respective recipients.

As is described above, in accordance with the domain names DN in the destination mailing addresses A, the sender's server 10 sorts the e-mails to be transmitted and collates the e-mail data to generate the transfer data D, and transmits the transfer data D to the distributor's server 30 which corresponds to the domain name DN. Thus, only the minimum number of procedures need be performed for each e-mail between the sender's server 10 and the distributor's server 30, thereby ensuring that the data transfer can be efficiently performed. Further, since the transfer data D is text data, the data volume can be reduced by compressing the transfer data D. In addition, since the FTP method is employed for the data transfer, the data is not transferred via multiple SMTP servers, as it is when the SMTP method is used, but is efficiently transmitted from the sender's server 10 to the distributor's server 30 in accordance with the IP protocol. As a result, the data transfer speed can be increased.

For example, for the transmission to two hundred thousand persons of e-mails of 500 bytes each, the volume of the transfer data D that is generated by grouping the e-mail data reaches 100 mega bytes. Further, since all the e-mails are text data, the total amount of compressed data would be only several to several tens of mega bytes. For example, if the transfer data D amounts to twenty mega bytes, and a transfer speed is 10 Mbps, only 16 seconds are required to transfer the data D from the server 10 to the server 30. That is, when the data transfer is performed using the above method, the e-mail recipient can obtain the immediate information almost in real time.

As is described above, since a large number of e-mails are grouped and transmitted for each of the domain names DN extracted from the mailing addresses A, i.e., the domain names DN for the ISPs that are used by the e-mail recipients, a data transfer for a large volume of e-mails can be performed at a speed higher than the conventional way. As a result, even when a financial organization employs e-mail to distribute immediate information, such as stock prices and currency exchange rates, many times a day, the financial organization is able to provide a value-added service for the recipients, i.e., the organization's clients. Furthermore, since the above method is employed, the data transfer capability of the system is considerably increased while using the same hardware as is used conventionally, and the system costs incurred can be reduced.

In one case, with the above configuration, the sender's server 10 provides a service for a large number of e-mails and charges the distributor's server 30 a fee for the service; in another case, the distributor's server 30 employs a service provided by the sender's server 10 to provide information for the client, and charges the server 10 the service fee; and in one further case, the sender's server 10, the distributor's server 30 or both, provides immediate information for an e-mail recipient and charges the recipient an information fee. In these cases, either the information collected by the charge information collector 19 of the server 10 or by the charge information collector 37 of the server 30 can be employed to assess a service fee to be paid by the side for which the value added service is provided.

2. Second Embodiment

An e-mail transfer system according to a second embodiment of the present invention that uses a template to prepare e-mail will now be described. In the following explanation, the same reference numerals as used for the first embodiment are again used to denote corresponding components, and no further explanation for them will be given.

In this embodiment, as in the first embodiment, when an information sender, such as a bank or a stock brokerage, transmits multiple e-mails using a server 10, the e-mail transfer system groups the data for these e-mails for each distributor, such as an ISP, and transmits the data via a network 20, such as the Internet, to a server 30 of a distributor. The distributor's server 30 then analyzes the grouped data to generate multiple e-mails, and distributes the thus obtained e-mails to the destinations (clients) having the corresponding mailing addresses A.

Figure 10:
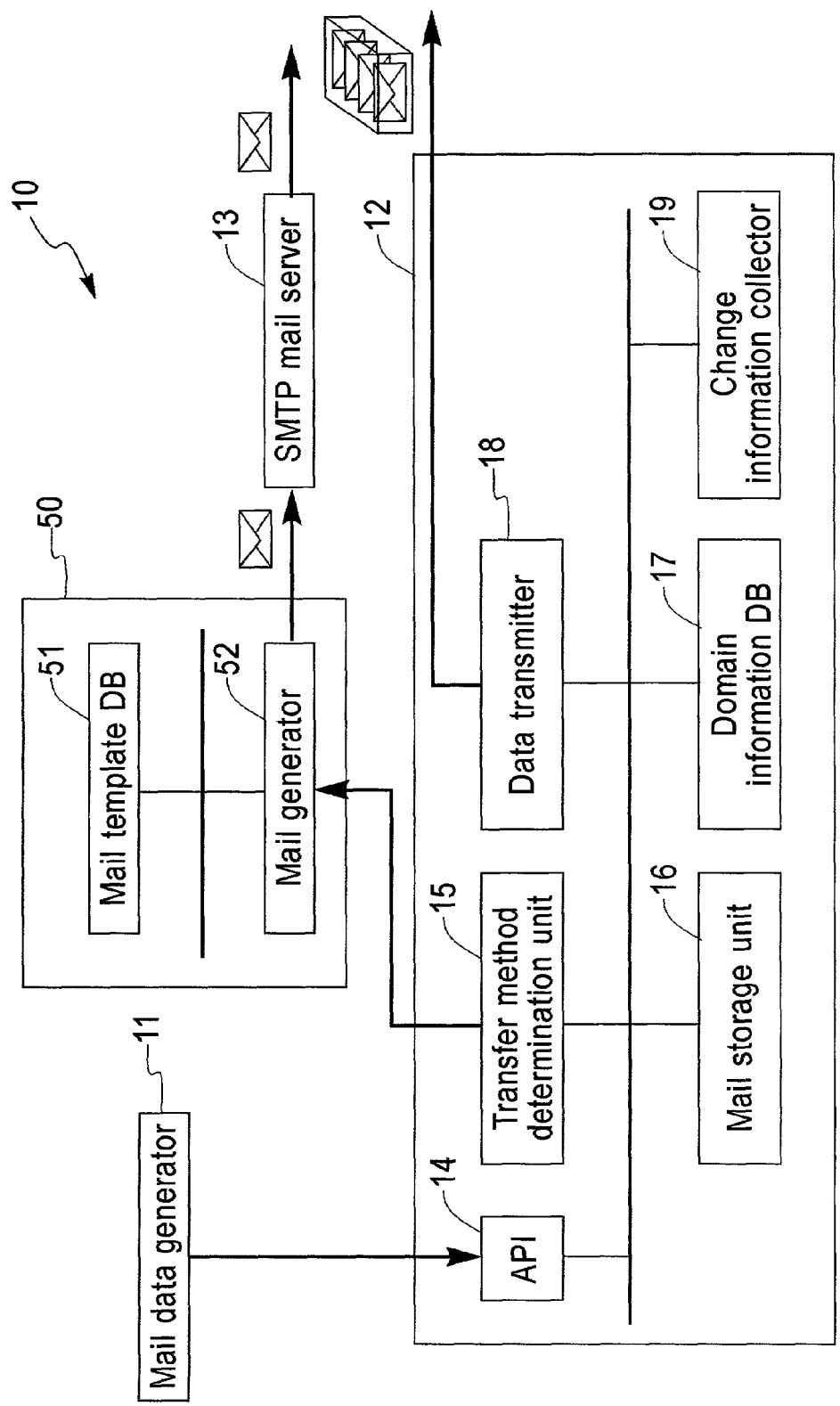
FIG. 10 is a diagram showing the configuration of a server for a sender according to the second embodiment of the present invention.

As is shown in FIG. 10, the server 10 of the sender can be connected to a mail data generator 11, and includes: a main server 12 for grouping and transmitting e-mail data for multiple recipients; an SMTP mail server 13 for transmitting e-mails, as in the conventional case, in accordance with SMTP; and an SMTP mail data generator 50 for generating e-mail data for transmission by the SMTP mail server 13.

The mail data generator 11 can generate data of individual e-mails by entering a destination mailing address A, a subject name K and a mail text B in the conventional manner. At this time, in this embodiment, a template constituting the basic contents (format) of the mail text B can be employed. In an example template T shown in FIG. 11, input positions P for various keywords (indicated by <EXPORT=****>) that differ in content depending on the e-mail, are designated for mail text B that can be used in common for multiple e-mails. For the mail data generator 11, the mail creator selects one of several types of template T, and enters at an input position P a keyword W, such as a client name, that is to be replaced with default data.

Figure 12:
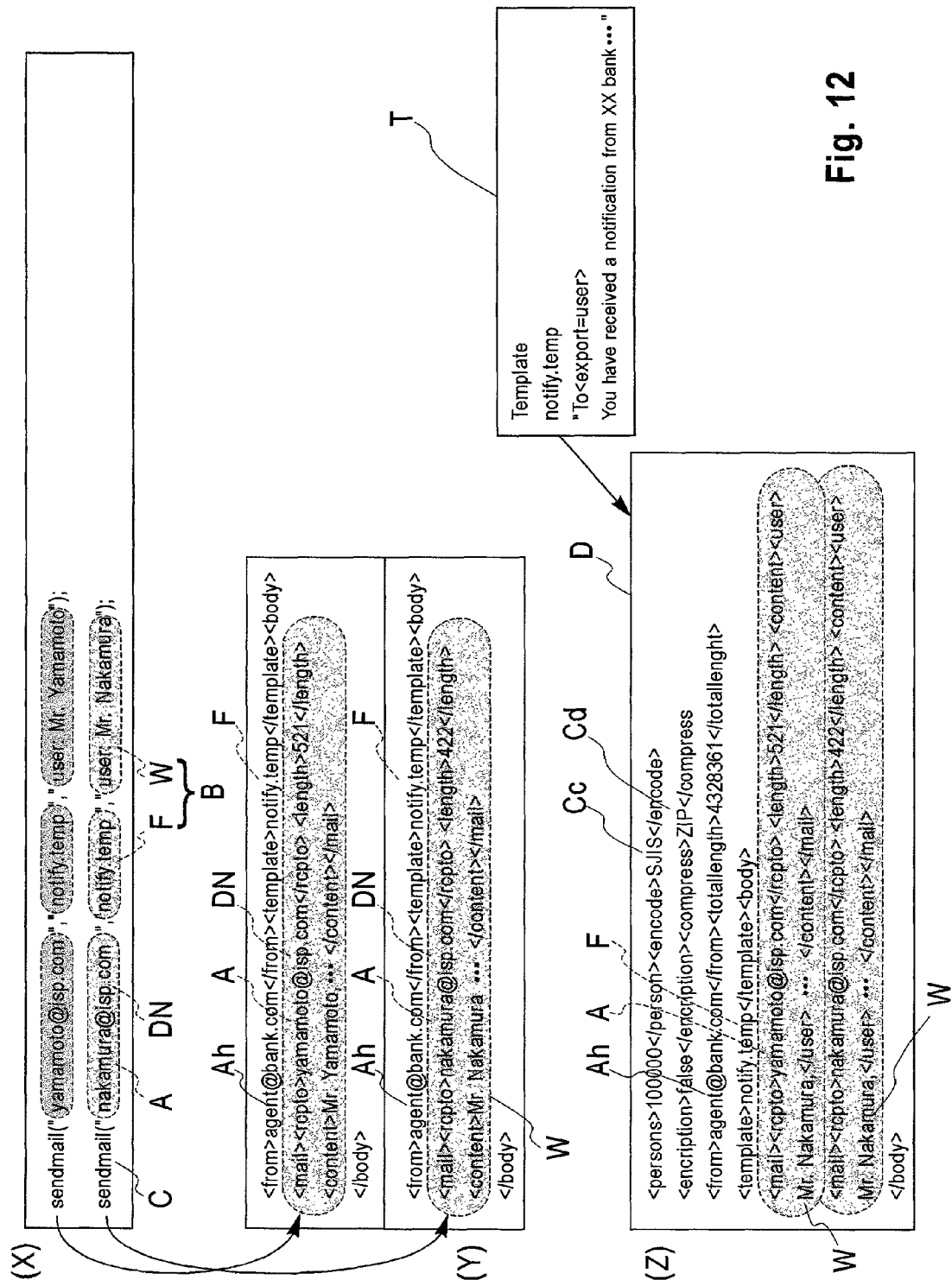
FIG. 12 is a diagram showing the changes in data effected by the process that transfer data is generated according to the second embodiment.

Sample data X in FIG. 12 is a diagram showing the example data that is produced for multiple e-mails when an application executed in the mail data generator 11 is used for the generation of e-mail data. As is shown in this sample data, a mailing address A for an e-mail destination, a selected template information F for the mail text B, and a keyword W are entered. When the e-mail creator performs a predetermined mail transmission operation, the application executed in the mail data generator 11 holds the data with a command C "sendmail" attached.

Figure 13:
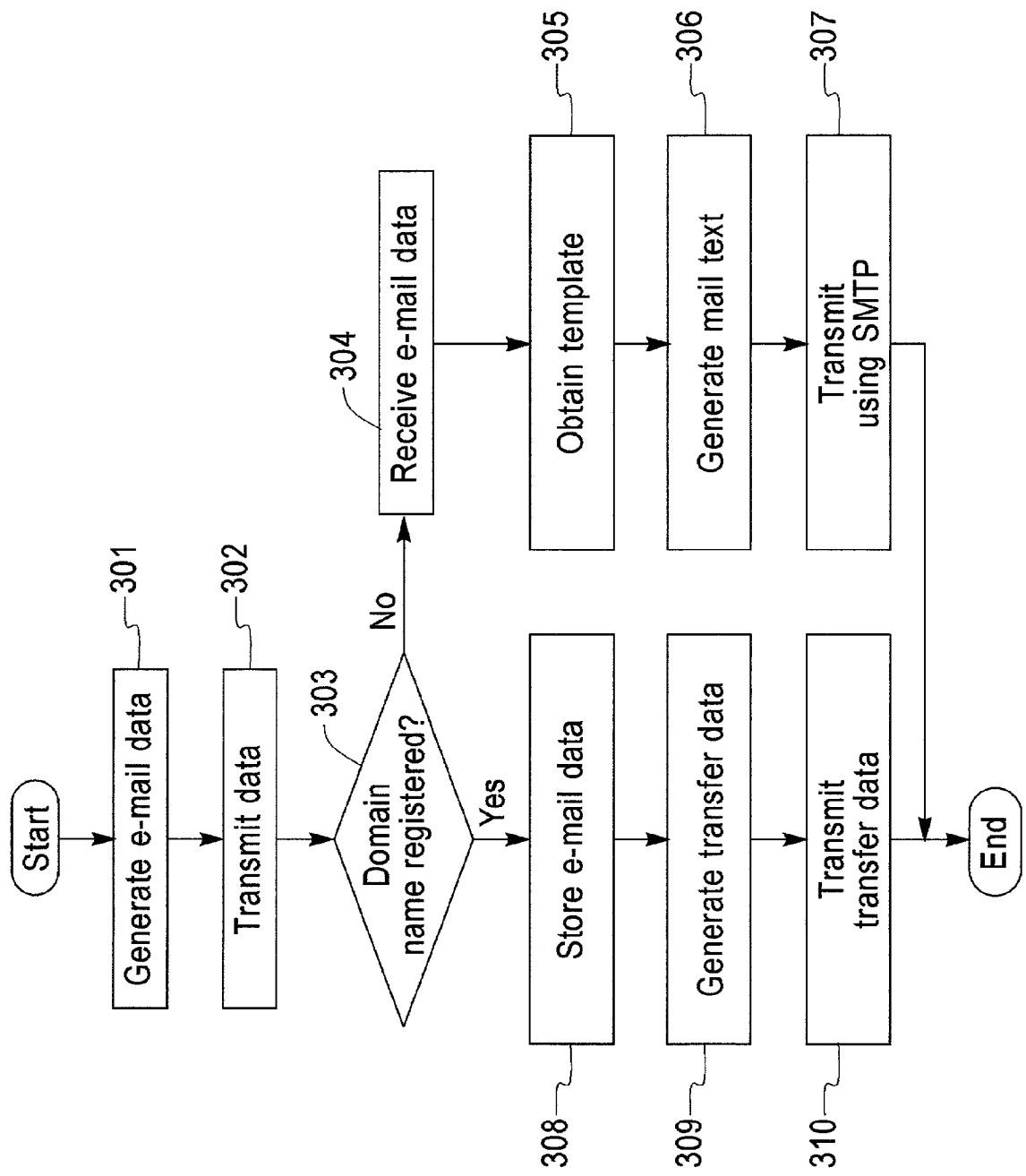
FIG. 13 is a flowchart showing the processing performed on the sender side.

As is shown in FIG. 13, the mail data generator 11 generates e-mail data (step 301) and transmits to the main server 12 each time a predetermined period elapses, or each time the e-mail creator performs a predetermined mail transmission operation, the mailing address A, the subject name K and the mail text B as the e-mail data that has been generated at that time (step 302). The data for the mail text B includes specific template information F indicating the type of template T that has been selected, and the keyword W.

At the mail server 12, when the API 14 receives the e-mail data generated by the mail data generator 11, the transfer method determination unit 15 determines whether the domain name DN in the mailing address A is the one that is stored in the domain information DB 17 (step 303). As a result, once it is found that the domain name DN is stored in the domain information DB 17, the data for multiple e-mails addressed to multiple recipients having the corresponding domain name DN are grouped and transmitted to the server 30, as will be described later.

When domain names DN are determined to be the ones that are not stored in the domain information DB 17, the SMTP mail server 13, in accordance with SMTP, transmits the corresponding e-mails one by one, in the conventional manner. In this case, e-mail data is first transmitted by the transfer method determination unit 15 to an SMTP mail data generator 50, which includes a mail template database (DB) 51 wherein data is stored that has been registered in advance for the template T, and a mail generator 52. Thus, when the SMTP mail data generator 50 receives the e-mail data (step 304), it obtains the data for the corresponding template T from the mail template DB 51, based on the selected template information F included in the e-mail data (step 305). Then, the mail generator 52 generates mail text B for one e-mail by inserting, in the data obtained for the template T, the keyword W that is included in the e-mail data (step 306). Thereafter, the data for the one e-mail, which includes the data for the mail text B and the mailing address A, is transmitted to the SMTP mail server 13, which, in the conventional manner, transmits the e-mail data for individual e-mails to the server 30 in accordance with the SMTP method (step 307).

When it is ascertained at step 303 that a domain name DN is stored in the domain information DB 17, during the processing beginning at step 308 the data for multiple e-mails having a corresponding domain name DN are grouped and transmitted to the server 30. At this time, the data for the template T, which is used to constitute the mail text B for the e-mail, may be held by the server 10 of the sender, and along with the data for the keyword W, this data for the template T may be transmitted to the server 30. Or, in the event the data for the selected template T is held by the server 30 of the distributor, only the selected template information F indicating the selected template T may be transmitted with the keyword W by the server 10. In the first case, the template T for the latest contents prepared by the sender can be used at an arbitrary time, while in the second case, the amount of data to be transmitted can be minimized. In this embodiment, in the following explanation, the second case is employed, i.e., the server 10 transmits, along with the keyword W, only the template information F that indicates the selected template T.

First, when it is ascertained at step 303 that a domain name DN is stored in the domain information DB 17, corresponding e-mail data received from the mail data generator 11 are stored in the mail storage unit 16, wherein the data is sorted for each domain name DN in the individual mailing address A (step 308).

Each time a predetermined period has elapsed, or each time a predetermined number of e-mails have been accumulated in the mail storage unit 16, the data transmitter 18 extracts from the mail storage unit 16, for each domain name DN, the e-mail data for multiple e-mails addressed to multiple recipients, and groups multiple sets of e-mail data for each domain name DN to generate transfer data D.

Sample data Y in FIG. 12 is a diagram showing the example data for multiple e-mails that are currently stored in the mail storage unit 16. As is shown in this sample data, the data for each e-mail is converted into a predetermined language, such as HTML or XML, and includes: a mailing address Ah for a sender, written between the tags <from> and </from>; selected template information F, written between the tags <template> and </template>; and a destination mailing address A and a keyword W, written between the tags <mail> and </mail>. The data transmitter 18 extracts the mailing address A, the selected template information F and the keyword W from the data for multiple e-mails which have the common domain names DN in the destination mailing addresses A. Then, as is shown in sample data Z in FIG. 12, the mailing addresses A, the selected template information F and the keywords W are arranged in a predetermined order, such as in accordance with the order in which the data were created. Furthermore, so that the transfer data (transmission data) D can be generated, the mailing address Ah of the sender, and the character code Cc and the data compression method Cd are added to the e-mail data as sender information that has been set in advance. (step 309). The data transmitter 18 compresses the thus obtained transfer data D, and transmits it via the network 20 to the server 30 that corresponds to the domain name DN included in the transfer data D (step 310).

Figure 14:
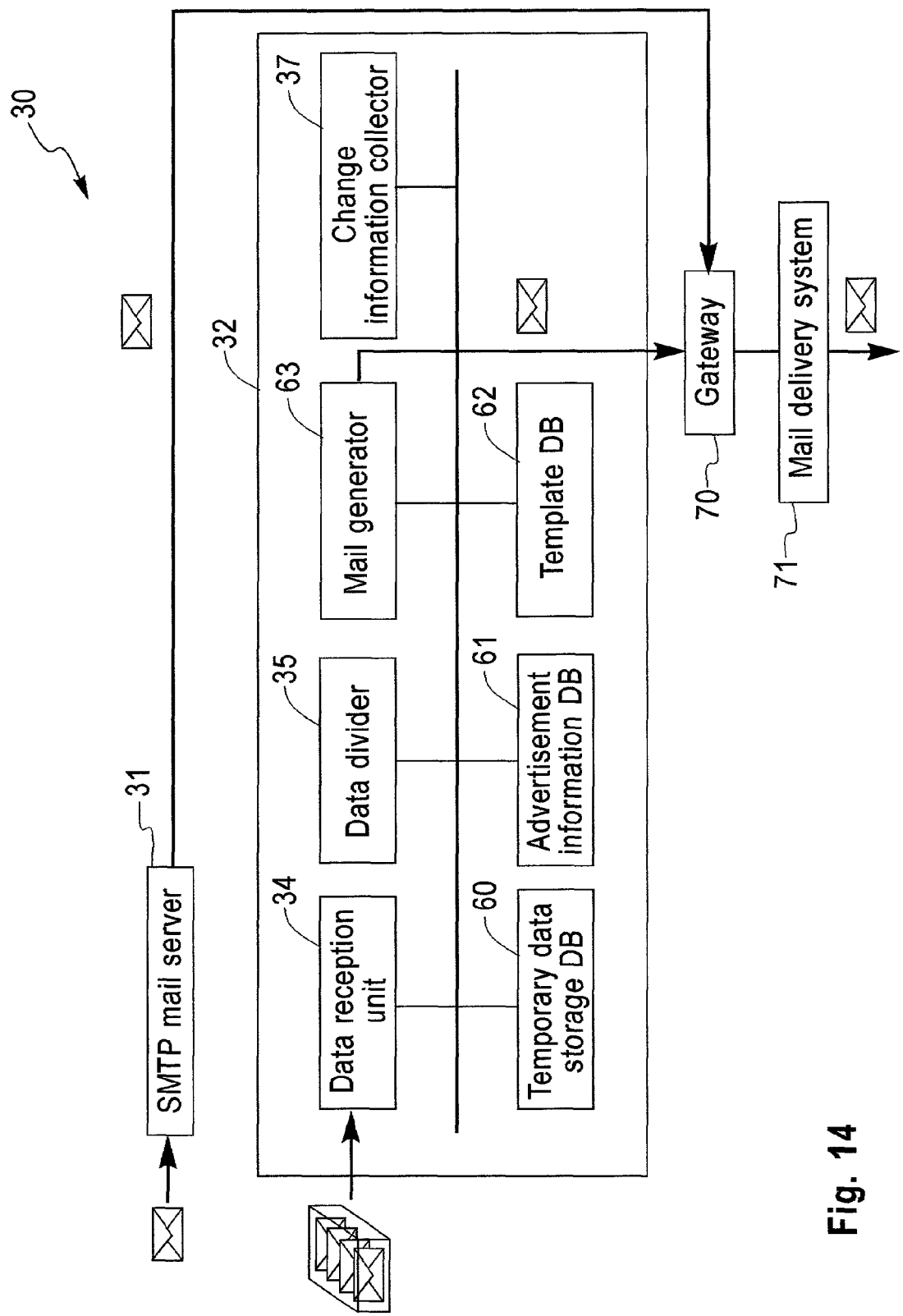
FIG. 14 is a diagram showing the configuration of a server for a distributor.

As is shown in FIG. 14, the server 30 of the distributor includes: an SMTP mail server 31, for receiving e-mail data from the SMTP mail server 13 of the server 10; and a main server 32, for receiving the transfer data D from the server 10.

The main server 32 includes not only a data reception unit 34, a data divider 35 and a charge information collector 37, as in the first embodiment, but also a temporary data storage database 60, an advertisement information database 61 in which advertisement information that is attached to e-mail by the distributor is stored; a template database (template data storage unit) 62, in which data for the template T is stored; and a mail generator 63, for generating individual e-mails. This main server 32 transmits to the data divider 35 the transfer data D received by the data reception unit 34.

Figure 15:
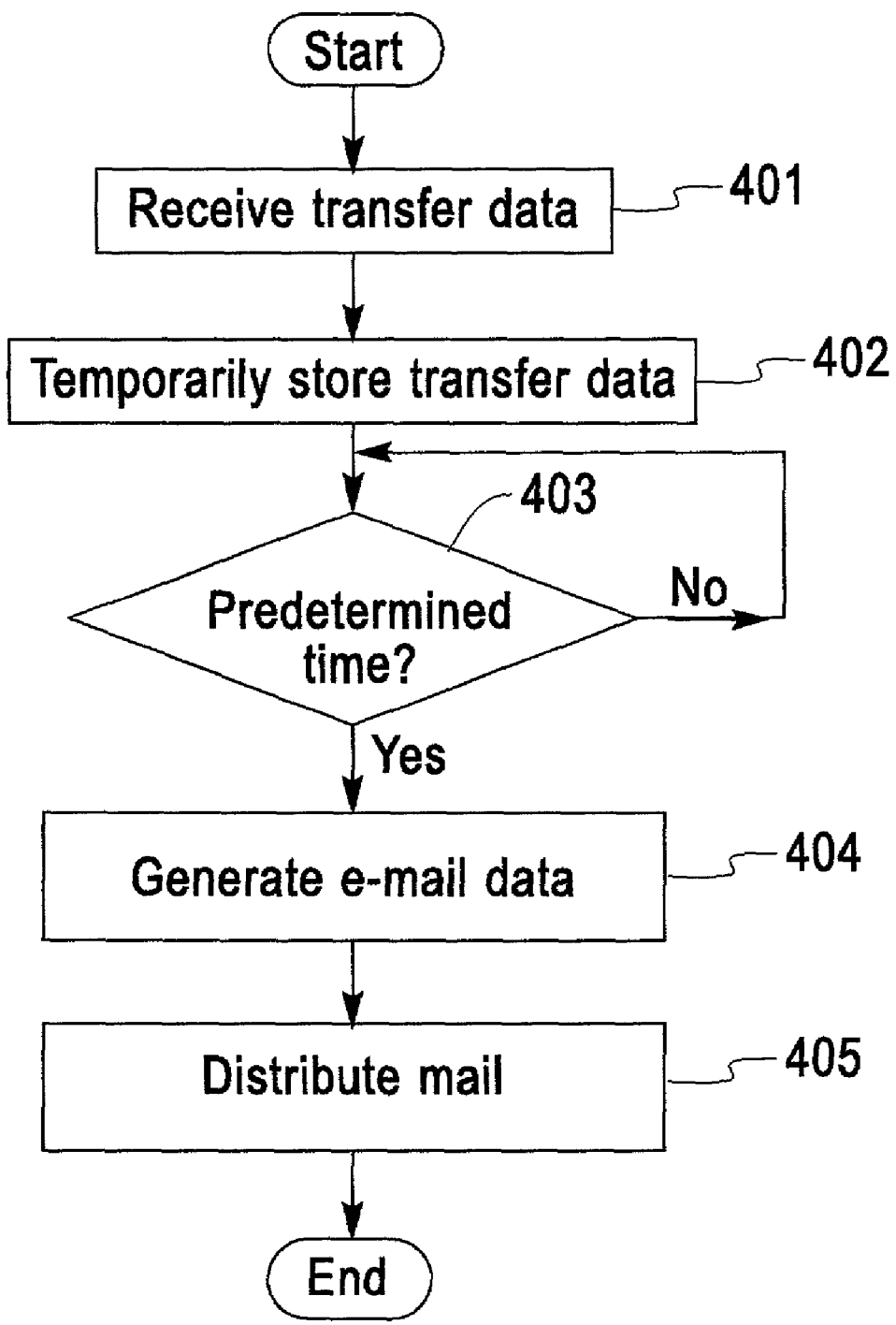
FIG. 15 is a flowchart showing the processing performed on the recipient side.

As is shown in FIG. 15, the data divider 35 receives the transfer data D, which is generated by grouping multiple sets of e-mail data for multiple recipients (step 401), and divides it. During this processing, the mailing address A, the selected template information F and the keyword W are extracted from the transfer data D shown in sample data Z in FIG. 12, and are stored in a temporary data storage database 60 (step 402).

Then, the mail generator 63 generates from the received data each of the original e-mails. In this embodiment, after a predetermined time, such as a time designated by the sender, has elapsed, the server 30 generates and distributes the e-mail data. Further, the mail generator 63 can set a priority level for distribution of the e-mail. For example, the information for the priority level can be set by the sender in the transfer data D when it is transmitted by the server 10 of the sender. Or the information for the priority level can be set in advance and held by the server 30 of the distributor. When the mail generator 63 distributes e-mail, the information for either one or two priority levels can be referred to, and the processing can be performed in accordance with the relevant priority level. Specifically, when multiple sets of transfer data D must be analyzed at the same time for the distribution of e-mail, transfer data D having the higher priority level is processed first. Furthermore, when the priority levels based on information included in multiple sets of transfer data D is the same, priority levels based on information held by the server 30 of the distributor can also be employed to determine which transfer data D is to be processed first.

During the generation and distribution of e-mail by the mail generator 63, all advertisement information that is included in the text information stored in the advertisement information DB 61 is attached to the generated e-mail. At this time, since the FTP method is employed for the transmission of the transfer data D, the identity of the server 10 of the sender, i.e., the company name, can be easily determined by the server 30 of the distributor, and therefore, when a company has registered advertisement information that is to be attached to e-mail, the advertisement information that the sender has registered can also be added.

When at step 403 the mail generator 63 determines that a predetermined time has been reached, at step 404 for generating an e-mail, the mail generator 63 extracts from the temporary data storage DB 60 the mailing address A, the selected template information F to be used as the mail text B and the keyword W, and from the advertisement information DB 61 advertisement information that is to be attached. In addition, the mail generator 63 extracts, from the template DB 62, data for the corresponding template T. Then, to generate the mail text B for the e-mail, the mail generator 63 inserts in the obtained data for the template T the keyword W included in the e-mail data and the advertisement information. Thereafter, to complete the generation of the e-mail, data such as the mailing address Ah of the sender, which is written between the tags <from> and </from>, is extracted from the transfer data D as shown in sample data Z in FIG. 12 and added to the mail text B.

The thus generated e-mail data may then be distributed to one of the mail boxes established for the individual recipients, as in the first embodiment, but in this embodiment, the mail generator 63, instead of performing the mail distribution process, transmits the data for the individual e-mails, via a gateway 70, to an external mail delivery system 71, and the mail delivery system 71 transmits the e-mail data to the PCs, the mobile phones or the mobile information terminals of the individual recipients.

The charge information collector 37 collects, as charge information, the destinations (mailing addresses A) of the e-mails received by the data reception unit 34 or distributed by the mail distribution unit 36, the number of e-mails and the number of transfers, so that, when the charge information collector 37 receives grouped e-mails, it pays a fee to the sender who operates the server 10', or receives fees from the recipients, and collect fees from the recipients, based on a predetermined contract. In addition, since in this embodiment advertisement information extracted from the advertisement information DB 61 can be added to the e-mail distributed by the server 30 of the distributor, a fee to be paid by the provider of the advertisement information can also be assessed.

With this arrangement, the same effects can be obtained as in the first embodiment, and a large volume of e-mails can be transmitted from the sender's server 10 to the distributor's server 30 at a considerably higher speed than in the conventional case. Further, no problem arises when a financial organization employs e-mails to distribute immediate information, such as stock prices and current exchange rates, many times a day, and a value-added service can be provided for a recipient, i.e., a client. In addition, since the template T is employed, the amount of data to be transmitted can be even more reduced, and more outstanding effects can be obtained than those that were previously enumerated.

As in the first and second embodiments, a bank or a stock brokerage owns a server 10 that transmits e-mails to clients. This server 10 can also be used as general, so-called a ISP's server. That is, the server 10 can sort, for each destination ISP, data for e-mails transmitted by multiple users that employ the ISP, and can then transmit the sorted e-mail. In this case, the same effects as described above can be obtained.

Furthermore, since various formats for assessing charges can be employed in accordance with the type of service that is to be provided, the present invention is not limited to a special format for accessing charges.

In addition, a program that permits the server 10 of a sender to group e-mail data, and a program that permits the server 30 of a distributor to analyze the grouped data and generate the data for each e-mail can also be implemented as follows as a storage medium and a program transmission apparatus. Specifically, a storage medium, such as a CD-ROM, a DVD, a memory or a hard disk, can be employed, so that the above described programs need only be stored as computer readable programs on this storage medium. A program transmission apparatus comprises: storage means, such as a CD-ROM, a DVD, a memory or a hard disk, for storing the above described programs; and transmission means for reading the programs from the storage means and transmitting them, via a connector or a network, such as the Internet or a LAN, to an apparatus whereat they are executed. The program transmission apparatus constitutes appropriate means for installing the above programs in a server. Moreover, the configurations of each embodiment can be variously modified to provide another configuration, without departing from the scope of the invention.

As is described above, according to the present invention, a large volume of e-mails can be transmitted at a higher speed than in the conventional case, and a value-added service can be provided.

What is claimed is:

1. A system for transmitting e-mail data to a plurality of recipients via a network, comprising:
    reception means for receiving the e-mail data that includes destination address information, domain information included therein and mail text information;
    transmission data generation means for querying a domain information database to determine if said domain information is registered in said domain information database and for grouping multiple sets of the e-mail data by the domain information when said domain information is registered in said domain information database to generate transmission data, wherein a set comprises e-mail data addressed to multiple different recipients having common domain information;
    domain information database for storing the domain information which allows grouping of the multiple sets of the e-mail data;
    first transmission means for transmitting said generated transmission data via said network to a computer system designated based on said domain information using at least one of FTP (file transfer protocol) and HTTP (hypertext transfer protocol);
    second transmission means for transmitting each set of the e-mail data one by one via said network using SMTP (simple mail transfer protocol), if it is determined that the domain information has not yet been registered in said domain information database; and
    collector means for collecting e-mail transmission information for use in charging for transmission of e-mail data.

2. The system according to claim 1, wherein said transmission data generation means generates said transmission data at a predetermined timing.

3. The system according to claim 1, wherein said transmission data generation means generates said transmission data by extracting said destination address information and said mail text information from the e-mail data.

4. The system according to claim 1, wherein said transmission data generation means generates said transmission data based on the e-mail data that includes, as said mail text information, template data that forms a mail text and keyword data that is to be inserted into said template data.

5. The system according to claim 1, wherein said transmission data generation means generates said transmission data based on said e-mail data that includes, as said mail text information, data for designating a template that forms a mail text and keyword data that is to be inserted into said template.

6. An electronic mail (e-mail) method for an e-mail system having a domain database, comprising the steps of:

receiving e-mail data including mail text information and destination address information, which includes domain information;

querying said domain database with said domain information to determine if said domain information has been registered with the domain database, whereby e-mail data is to be grouped for transmission;

grouping the e-mail data by the domain information into one or more sets, wherein a set comprises e-mail data addressed to multiple different recipients having common domain information;

generating transmission data for said one or more sets, based on grouped e-mail data wherein said transmission data comprises at least a set of e-mail data and domain information;

transmitting said transmission data to a computer system that is designated by said domain information via the network; and collecting transmission information for use in charging for transmission of e-mail data.

7. The method according to claim 6, further comprising the steps of: receiving, at the computer system, said transmission data that includes the destination address information for said recipients, and the mail text information to be distributed to recipients; and generating the e-mail data from said transmission data, for each of said recipients, that includes the destination address information and the mail text information.

8. The method according to claim 7, further comprising the step of distributing the e-mail data to each of said recipients, based on the destination address information.

9. A non-transitory storage medium storing a program product executed on a computer for performing a method of transmitting e-mail data, comprising the steps of:

receiving the e-mail data including mail text information and destination address information, which includes domain information;

querying said domain database with said domain information to determine if said domain information has been registered with the domain database, whereby e-mail data is to be grouped for transmission;

grouping the e-mail data by the domain information into one or more sets, wherein a set comprises e-mail data addressed to multiple different recipients having common domain information; generating transmission data for said one or more sets, based on grouped e-mail data wherein said transmission data comprises at least a set of e-mail data and domain information;

transmitting said transmission data to a computer system that is designated by said domain information via the network; and collecting transmission information for use in charging for transmission of e-mail data.

10. The non-transitory storage medium according to claim 9, wherein, said generating step further comprises the step of adding paired identification tags at the start and the end of a block having said destination address information and said mail text information.

11. The system according to claim 1 wherein said transmission data comprises at least one set of e-mail data, domain information and at least one of template information, advertisement information and priority information.

* * * * *